United States Patent
Song et al.

(10) Patent No.: US 7,713,636 B2
(45) Date of Patent: May 11, 2010

(54) MULTI-LAYER FILMS COMPRISING PROPYLENE-BASED POLYMERS

(75) Inventors: Kwangjin Song, Pittsford, NY (US); Jean-Roch Schauder, Wavre (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 466 days.

(21) Appl. No.: 11/640,510

(22) Filed: Dec. 15, 2006

(65) Prior Publication Data

US 2008/0145670 A1  Jun. 19, 2008

(51) Int. Cl.
  *B32B 27/00* (2006.01)
  *B32B 15/04* (2006.01)
  *B32B 27/36* (2006.01)
  *B32B 27/08* (2006.01)

(52) U.S. Cl. ............... 428/500; 428/515; 428/457; 428/423.1; 428/476.3; 428/483

(58) Field of Classification Search ............ None
See application file for complete search history.

(56) References Cited

U.S. PATENT DOCUMENTS

| | | | |
|---|---|---|---|
| 4,561,920 A | 12/1985 | Foster | 156/244.11 |
| 4,650,721 A | 3/1987 | Ashcraft et al. | 428/516 |
| 4,867,336 A * | 9/1989 | Stewart | 220/359.3 |
| 4,880,706 A | 11/1989 | Mazuera et al. | 428/516 |
| 5,336,721 A * | 8/1994 | Kiang | 525/78 |
| 5,561,092 A | 10/1996 | Ewen et al. | 502/117 |
| 6,455,170 B1 | 9/2002 | Yasui et al. | 428/500 |
| 6,472,081 B1 | 10/2002 | Tsai et al. | 428/457 |
| 6,919,407 B2 | 7/2005 | Tau et al. | 525/191 |
| 2004/0138392 A1 | 7/2004 | Jiang et al. | 526/114 |
| 2004/0204537 A1 | 10/2004 | Mori et al. | 524/556 |

FOREIGN PATENT DOCUMENTS

| | | |
|---|---|---|
| EP | 0 629 631 | 12/1994 |
| EP | 0 629 632 | 12/1994 |
| EP | 1 017 729 | 7/2000 |
| EP | 1 306 406 | 5/2003 |
| EP | 1 541 602 | 6/2005 |
| EP | 1 614 699 | 1/2006 |
| WO | WO 99/43496 | 9/1999 |
| WO | WO 02/36651 | 5/2002 |
| WO | WO 2007/001694 | 1/2007 |

* cited by examiner

*Primary Examiner*—Sheeba Ahmed

(57) ABSTRACT

This disclosure relates to multi-layer films having improved peel strength properties and comprising a core layer and a first tie layer made from at least 5 wt % of a grafted propylene-based polymer. Optionally, the multi-layer film may have one or more skin layers, and/or a second tie layer.

48 Claims, No Drawings

MULTI-LAYER FILMS COMPRISING PROPYLENE-BASED POLYMERS

FIELD

This disclosure relates generally to multi-layer films, and more specifically to multi-layer films with improved peel strength properties due to inclusion of a tie layer that comprises a novel graft reaction product of a propylene-based polymer backbone and a grafting monomer.

BACKGROUND

Propylene-based multi-layer films are widely used in packaging applications, such as pouches for dry food mixes, pet foods, snack foods, and seeds. Such multi-layer films must have the ability to resist peeling at the interface between the layers of the multi-layered film.

Typical multi-layered films include at least a core layer, typically comprised of polypropylene (PP), an outer layer typically known as a skin layer, typically comprised of polar polymers, and a tie layer located intermediate the core layer and the skin layer. Conventional tie layers are mostly maleic anhydride (MAH) grafted polypropylene (PP-g-MAH) homopolymers, copolymers, or combinations of PP-g-MAH with non-grafted polyolefins. In general, these maleated adhesive tie layers lack peel resistance at their interfaces with other adjacent layers. This is because they are poor in stress dissipation and reactivity due to their high chain rigidity and interfacial tension. Many applications, such as laminates of toothpaste tubes, require much stronger interfacial strength than these conventional film compositions can provide.

U.S. Pat. No. 6,919,407 discloses a film reported to have enhanced machine direction (MD) tear properties. The film has at least one polymer layer comprising at least 50 wt % propylene and at least 5 wt % ethylene and/or one or more unsaturated comonomers, such as $C_4$-$C_{20}$ alpha olefins and dienes.

U.S. Pat. No. 4,561,920 describes a method of producing bi-axially oriented oxygen and moisture barrier film comprising co-extruding at least one layer of polyolefin material (polyethylene or polypropylene or ethylene-propylene copolymers), at least one layer of ethylene vinyl alcohol and at least one adhesive layer. The adhesive layer used in the patent is Admer QF500B, which is a maleic anhydride-modified polypropylene.

U.S. Pat. No. 4,650,721 describes a process for forming a firmly bonded co-extruded film combination. The process comprises forming an intimate combination of polypropylene and a maleic anhydride-modified olefin copolymer and forming a film of at least one layer of the intimate combination and an ethylene vinyl alcohol copolymer. The adhesion is effected by orienting the film. The maleic anhydride grafted polyolefin is a maleic anhydride grafted polypropylene homopolymer and has a softening point of 157° C.

U.S. Pat. No. 4,880,706 describes a multilayer co-extruded film having been bi-axially oriented and comprising a five-layer structure, ABCBA. A is polyethylene, polypropylene or copolymers of ethylene and higher alpha-olefins. B is an adhesive layer and C is a layer of an ethylene vinyl alcohol copolymer. The adhesive layer includes an ethylene-vinyl acetate copolymer and a maleic acid modified olefin polymer.

U.S. Pat. No. 6,472,081 discloses an oriented multilayer film combination including (1) a propylene homopolymer or copolymer core layer; (2) a metallizable skin layer, including a material selected from an ethylene-vinyl alcohol copolymer (EVOH), a polyvinyl alcohol (PVOH), and polyester; and (3) an adhesive tie layer made from a material selected from a maleic anhydride modified polypropylene homopolymer or copolymer, a high density polyethylene (HDPE), and an ethylene-vinyl acetate (EVA) copolymer. The adhesive tie layer is disposed between the core layer and the skin layer.

European Patent No. 1 614 699 provides a polypropylene composite film layer with 0-95 wt % of crystalline polypropylene and 5-100 wt % of propylene/1-butene random copolymer. The random copolymer contains: 60-90 mol % of propylene-derived units and 10-40 mol % of 1-butene-derived units, and has a molecular weight distribution (Mw/Mn) of 1 to 3, and a melting point of 40-120° C.

European Patent No. 1 541 602 discloses a propylene polymer with a propylene main chain having a stereo-block structure containing an isotactic block and a side chain containing a carboxylic acid group, an acid anhydride group or a carboxylic acid ester group. The propylene polymer main chain is obtainable by using a single site catalyst wherein the single site catalyst is a C1-symmetric ansa-metallocene compound having a transition metal-containing bridge group.

Other patents and publications of relevance to this disclosure include: European Patents 1,017,729; 629,631 and 629,632.

It would be very useful to the films industry to produce films that include tie layers with improved peel strength, greater elasticity, greater energy dissipation and lower interfacial tension with ethylene-based polar polymers and polar modified polyolefins of the skin layer, such as ethylene vinyl alcohol (EVOH).

SUMMARY

This disclosure relates to a multi-layer film comprising a core layer and a first tie layer. The first tie layer comprises at least 5 wt % of a grafted propylene-based polymer, based upon the weight of the first tie layer. The grafted propylene-based polymer comprises a propylene-based polymer backbone and a grafting monomer, the grafted propylene-based polymer having a differential scanning calorimetry (DSC) melting temperature of 105° C. or less and a heat of fusion of 75 J/g (Joules per gram) or less.

This disclosure also relates to a method of preparing a multi-layer film comprising: a core layer and a first tie layer, wherein the tie layer comprises at least 5 wt % of a grafted propylene-based polymer, based upon the weight of the first tie layer, the grafted propylene-based polymer comprising a propylene-based polymer backbone and a grafting monomer, the grafted propylene-based polymer having a DSC melting temperature of 105° C. or less and a heat of fusion of 75 J/g or less.

This disclosure further relates to a three or more layer film comprising: (a) a core layer being either a single-layer or a multi-layer polymer substrate structure; (b) a first tie layer comprising at least 5 wt % of a grafted propylene-based polymer, based upon the weight of the first tie layer, the grafted propylene-based polymer comprising a propylene-based polymer backbone and a grafting monomer, the grafted propylene-based polymer having a DSC melting temperature of 105° C. or less and a heat of fusion of 75 J/g or less; and (c) a first skin layer, wherein the first tie layer is intermediate the core layer and the first skin layer.

This disclosure still further relates to a method of improving the peel resistance of a multi-layer film by forming a film having a first tie layer, comprising at least 5 wt % of a grafted propylene-based polymer, based upon the weight of the first tie layer. The grafted propylene-based polymer comprises a propylene-based polymer backbone and a grafting monomer, the grafted propylene-based polymer having a DSC melting temperature of 105° C. or less and a heat of fusion of 75 J/g or less.

This disclosure still further relates to a multi-layer film comprising: (a) a core layer; (b) a first tie layer comprising at least 5 wt % of a grafted propylene-based polymer, based upon the weight of the first tie layer, the grafted propylene-based polymer comprising a propylene-based polymer backbone and a grafting monomer, the grafted propylene-based polymer having a DSC melting temperature of 105° C. or less and a heat of fusion of 75 J/g or less; (c) a first skin layer, wherein the first tie layer is located intermediate of the core layer and the first skin layer; and (d) a second skin layer located on the opposite side of the core layer from the first tie layer.

This disclosure still further relates to a multi-layer film comprising: (a) a core layer; (b) a first tie layer comprising at least 5 wt % of a grafted propylene-based polymer, based upon the weight of the first tie layer, the grafted propylene-based polymer comprising a propylene-based polymer backbone and a grafting monomer, the grafted propylene-based polymer having a DSC melting temperature of 105° C. or less and a heat of fusion of 75 J/g or less; (c) a first skin layer, wherein the first tie layer is located intermediate of the core layer and the first skin layer; (d) a second tie layer located on a side of the core layer opposite from the first tie layer; and (e) a second skin layer, wherein the second tie layer is located intermediate the core layer and the second skin layer.

DETAILED DESCRIPTION

Various specific embodiments, versions and examples will now be described, including exemplary embodiments and definitions that are adopted herein for purposes of understanding the claimed disclosure. While the following detailed description gives specific preferred embodiments, those skilled in the art will appreciate that these embodiments are exemplary only, and that the disclosure can be practiced in other ways.

As used herein, "polymer" may be used to refer to homopolymers, copolymers, interpolymers, etc. Likewise, a "copolymer" may refer to a polymer comprising two monomers or to a polymer comprising three or more monomers.

As used herein, "propylene-based polymer backbone" is defined to be a polymer comprising propylene and one or more $C_2$ and/or $C_4$-$C_{20}$ alpha olefins, propylene being the major component.

As used herein, "grafted propylene-based polymer" denotes a propylene-based polymer backbone as described above, having one or more grafting monomers bonded thereto.

As used herein, "isotactic" is defined as polymeric stereoregularity having at least 40% isotactic pentads of methyl groups derived from propylene according to analysis by $^{13}C$-NMR (Nuclear Magnetic Resonance).

As used herein, "intermediate" is defined as the position of one layer of a multi-layer film wherein the layer lies between two other identified layers. In some embodiments, the intermediate layer may be in direct contact with either or both of the two identified layers. In other embodiments, additional layers may also be present between the intermediate layer and either or both of the two identified layers.

Films according to this disclosure comprise an arrangement of polymeric layers that contribute individually and collectively to improving peel strength of the film. The layers can additionally have other functions such as improving the film's barrier properties, sealability, printability and/or subsequent adhesion to other substrates.

In the multi-layer films of this disclosure, the grafted propylene-based polymer may be incorporated into a tie layer.

In a preferred embodiment, this disclosure relates to a multi-layer polymeric film having improved peel strength properties, comprising a core layer and a tie layer, the tie layer having at least about 5 wt %, based upon the weight of the tie layer, of a grafted propylene-based polymer, the grafted propylene-based polymer having a DSC melting point of preferably about 120° C. or less, more preferably about 115° C. or less, more preferably about 105° C. or less, more preferably about 90° C. or less, more preferably about 85° C. or less, and most preferably about 75° C. or less, and a heat of fusion of preferably about 75 J/g or less, more preferably about 70 J/g or less, more preferably about 65 J/g or less, and most preferably about 60 J/g or less. One or more skin layers and one or more additional tie layers may also be provided.

Core Layer

As is known to those skilled in the art, the core layer of a multi-layered film is most commonly the thickest layer and provides the foundation of the multi-layer structure. In some embodiments, the core layer comprises at least one polymer or copolymer selected from the group consisting of propylene polymer, propylene-based copolymer, isotactic polypropylene (iPP), high crystallinity polypropylene (HCPP), propylene-ethylene copolymers containing about 2 to about 10 wt % ethylene, and any blends or combinations thereof. In a preferred embodiment, the core layer is an iPP homopolymer. An example of a suitable iPP homopolymer is ExxonMobil PP4612 (commercially available from ExxonMobil Chemical Company of Baytown, Tex., USA). Another suitable iPP is Total Polypropylene 3371 (commercially available from Total Petrochemicals of Houston, Tex., USA). A suitable HCPP is Total Polypropylene 3270 (commercially available from Total Petrochemicals of Houston, Tex., USA).

The core layer may further include a hydrocarbon resin. Hydrocarbon resins, which may be grafted with a grafting monomer as described herein, may serve to enhance or modify the flexural modulus, improve processability, or improve the barrier properties of the film. The resin may be a low molecular weight hydrocarbon that is compatible with the core polymer. Optionally, the resin may be hydrogenated. The resin may have a number average molecular weight (Mn) less than about 5000, preferably less than about 2000, most preferably in the range of from about 500 to about 1000. The resin can be natural or synthetic and may have a softening point in the range of from about 60° C. to about 180° C.

Suitable hydrocarbon resins include, but are not limited to, petroleum resins, terpene resins, styrene resins, and cyclopentadiene resins. In some embodiments, the hydrocarbon resin is selected from the group consisting of aliphatic hydrocarbon resins, hydrogenated aliphatic hydrocarbon resins, aliphatic/aromatic hydrocarbon resins, hydrogenated aliphatic/aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, polyterpene resins, terpene-phenol resins, rosins and rosin esters, hydrogenated rosins and rosin esters, and combinations thereof.

Hydrocarbon resins that may be suitable for use as described herein include EMPR 120, 104, 111, 106, 112, 115, EMFR 100 and 100A, ECR-373 and ESCOREZ® 2101, 2203, 2520, 5380, 5600, 5618, 5690 (commercially available from ExxonMobil Chemical Company of Baytown, Tex., USA); ARKON™ M90, M100, M115 and M135 and SUPER ESTER™ rosin esters (commercially available from Arakawa Chemical Company of Japan); SYLVARES™ phenol modified styrene, methyl styrene resins, styrenated terpene resins, ZONATAC™ terpene-aromatic resins, and terpene phenolic resins (commercially available from Arizona Chemical Company of Jacksonville, Fla., USA); SYLVATAC™ and SYLVALITE™ rosin esters (commercially available from Arizona Chemical Company of Jacksonville, Fla., USA); NORSOLENE™ aliphatic aromatic resins (commercially available from Cray Valley of France); DERTOPHENE™ terpene phenolic resins (commercially available from DRT Chemical Company of Landes, France); EASTOTAC™ resins, PICCOTAC™ $C_5/C_9$ resins, REGALITE™ and REGALREZ™ aromatic and REGALITE™ cycloaliphatic/aromatic resins (commercially available from Eastman Chemical Company of Kingsport, Tenn.); WINGTACK™ ET and EXTRA™ (commercially available from Sartomer of Exton, Pa., USA); FORAL™, PENTALYN™, and PERMALYN™ rosins and rosin esters (commercially available from Hercules, now Eastman Chemical Company of Kingsport, Tenn., USA); QUINTONE™ acid modified $C_5$ resins, $C_5/C_9$ resins, and acid modified $C_5/C_9$ resins (commercially available from Nippon Zeon of Japan); LX™ mixed aromatic/cycloaliphatic resins (commercially available from Neville Chemical Company of Pittsburgh, Pa., USA); CLEARON™ hydrogenated terpene aromatic resins (commercially available from Yasuhara of Japan); and PICCOLYTE™ (commercially available from Loos & Dilworth, Inc. of Bristol, Pa., USA). Other suitable hydrocarbon resins may be found in U.S. Pat. No. 5,667,902. The preceding examples are illustrative only and by no means limiting.

Preferred hydrocarbon resins for use in the films of this disclosure include saturated alicyclic resins. Such resins, if used, may have a softening point in the range of from about 85° C. to about 140° C., or preferably in the range of about 100° C. to about 140° C., as measured by the ring and ball technique. Examples of suitable, commercially available saturated alicyclic resins are ARKON-P® (commercially available from Arakawa Forest Chemical Industries, Ltd., of Japan).

The amount of such hydrocarbon resins, either alone or in combination, in the core layer is preferably less than about 20 wt %, and more preferably in the range of from about 1 wt % to about 5 wt %, based on the total weight of the core layer.

The core layer may further comprise one or more additives such as opacifying agents, pigments, colorants, cavitating agents, slip agents, antioxidants, anti-fog agents, anti-static agents, fillers, moisture barrier additives, gas barrier additives, and combinations thereof, as discussed in further detail below. A suitable anti-static agent is ARMOSTAT™ 475 (commercially available from Akzo Nobel of Chicago, Ill., USA).

Cavitating agents may be present in the core layer in an amount less than about 30 wt %, preferably less than about 20 wt %, and most preferably in the range of from about 2 wt % to about 10 wt %, based on the total weight of the core layer. Alternatively, the core layer may be cavitated by beta nucleation.

Preferably, the total amount of additives in the core layer comprises up to about 20 wt % of the core layer, based on the total weight of the core layer, but some embodiments may comprise additives in the core layer in an amount up to about 30 wt % of the core layer.

The core layer preferably has a thickness in the range of from about 5 µm to about 100 µm, more preferably from about 5 µm to about 50 µm, and most preferably from about 5 µm to about 25 µm.

Tie Layer

As is known to those skilled in the art, the tie layer of a multi-layer film is typically used to connect two other, partially or fully incompatible, layers of the multi-layer film structure, e.g., a core layer and a skin layer, and is positioned intermediate these other layers. In some embodiments, the tie layer is in direct contact with the surface of the core layer. In other embodiments, another layer or layers may be intermediate the core layer and the tie layer.

In one preferred embodiment, the tie layer comprises at least about 20 wt % of a grafted propylene-based polymer. The tie layer may also comprise one or more additional polymers. When one or more additional polymers are present, the grafted propylene-based polymer is preferably present in an amount of from at least about 10 wt % to about 75 wt % of the tie layer. Amounts of the grafted propylene-based polymer of less than about 10 wt % (e.g., about 5 wt %) or greater than about 75 wt % (e.g., about 90 wt % or more) are also permissible, depending upon the desired properties for the multi-layer film product. The optional additional polymers may comprise one or more $C_2$-$C_8$ homopolymers, copolymers, or terpolymers. Preferably, the additional polymer is comprised of at least one of a propylene homopolymer or copolymer (such as isotactic polypropylene homopolymer, a random copolymer of propylene and an ethylene and/or a $C_4$ to $C_{20}$ alpha olefin), an ethylene-propylene copolymer, an ungrafted propylene-based polymer as described herein, and/or combinations thereof. An example of a suitable iPP homopolymer is Total Polypropylene 3371 (commercially available from Total Petrochemicals of Houston, Tex., USA). The additional polymer can be produced in a process involving the use of traditional Ziegler-Natta catalysts or the use of metallocene based catalysts.

In another embodiment, a grafted polymer (preferably grafted with up to about 10 wt % of maleic acid or maleic anhydride) may be used as the additional polymer. Useful grafted polymers include homopolymers or copolymers of ethylene, and/or propylene and, optionally diene monomers, and combinations thereof.

In another embodiment, the additional polymer (preferably a propylene polymer such as isotactic homopolypropylene) is present in the tie layer at about 5 to about 95 wt %, preferably about 15 to about 90 wt %, and more preferably about 25 to about 85 wt %, based upon the weight of the tie layer. Likewise, the grafted propylene-based polymer is present in the tie layer at about 5 to about 95 wt %, preferably about 10 to about 85 wt %, more preferably about 15 to about 75 wt %, based upon the weight of the tie layer.

Grafted Propylene-Based Polymer

In a preferred embodiment, the tie layer comprises about 5 to about 50 wt %, preferably about 10 to about 40 wt %, and most preferably about 15 to about 30 wt % grafted propylene-based polymer which comprises a propylene-based polymer backbone and a grafting monomer.

Propylene-Based Polymer Backbone

The propylene-based polymer backbone of the present disclosure preferably comprises propylene, one or more $C_2$ or $C_4$-$C_{20}$ alpha olefins, and optionally a non-conjugated diene. Most preferably, the propylene-based polymer backbone comprises propylene, ethylene, and optionally 5-ethylidene-2-norbornene (ENB) or a linear alpha-omega diene.

In a preferred embodiment, the propylene-based polymer backbone has a DSC melting point of about 120° C. or less, preferably about 115° C. or less, more preferably about 105° C. or less, more preferably about 100° C. or less, more preferably 90° C. or less, more preferably about 85° C. or less, and most preferably about 75° C. or less, and a heat of fusion of about 75 J/g or less, preferably about 70 J/g or less, more preferably about 65 J/g or less, and most preferably about 60 J/g or less. The propylene-based polymer backbone is preferably a propylene-ethylene copolymer, preferably with a propylene content of at least about 75 wt % and ethylene content in the range of about 4 wt % to about 25 wt %, more preferably about 5 to about 24 wt %, more preferably about 7 to about 20 wt %, more preferably about 7 to about 16 wt %, and most preferably about 8 to about 15 wt %. In further embodiments, the propylene-based polymer backbone preferably comprises a suitable grade of VISTAMAXX™ elastomer (ExxonMobil Chemical Company, Baytown, Tex., USA), a suitable grade of VERSIFY™ polymer (The Dow Chemical Company, Midland, Mich., USA), a suitable grade of Tafmer™ XM or a suitable grade of Notiol™ (The Mitsui Company of Japan), or a suitable grade of Softel™ (Basell Company of the Netherlands).

In a preferred embodiment, the propylene-based polymer backbone has a Melt Index (MI) (according to ASTM D-1238, 2.16 kg @ 190° C.) of less than about 7 g/10 min, more preferably about 6.5 g/10 min or less, more preferably about 6 g/10 min or less, more preferably about 5.5 g/10 min or less, and most preferably about 5 g/10 min or less.

In a preferred embodiment, the propylene-based polymer backbone is a copolymer having a DSC melting temperature of about 105° C. or less and a heat of fusion of about 75 J/g or less.

Suitable methods for producing the propylene-based polymer backbones are found in U.S. Patent Application Publication No. 2004/0236042 and U.S. Pat. No. 6,881,800, which are incorporated by reference herein.

In another embodiment, the propylene-based polymer backbone may include copolymers prepared according the procedures in WO 02/36651, which is incorporated by reference here. Likewise, the propylene-based polymer backbone can include polymers consistent with those described in WO 03/040201, WO 03/040202, WO 03/040095, WO 03/040201, WO 03/040233, and/or WO 03/040442. Additionally, the propylene-based polymer backbone can include polymers consistent with those described in European Patent No. 1 233 191, and U.S. Pat. No. 6,525,157, along with suitable propylene homo- and co-polymers described in U.S. Pat. No. 6,770, 713 and U.S. Patent Application Publication No. 2005/ 0215964, all of which are incorporated herein by reference. The propylene-based polymer backbone can also include one or more polymers consistent with those described in European Patent Nos. 1,614,699; 1,017,729; 1,561,762 or 1,002, 809.

The monomers of the propylene-based polymer backbone are preferably polymerized in the presence of a chiral metallocene catalyst system (i.e., preferably a chiral metallocene pre-catalyst in combination with an activator and optionally a scavenger). The comonomer or comonomers of the propylene-based polymer backbone used in combination with propylene may be linear and/or branched. Preferred linear alpha-olefins include ethylene or $C_4$ to $C_8$ alpha-olefins, more preferably ethylene, 1-butene, 1-hexene, or 1-octene, even more preferably ethylene or 1-butene. Preferred branched alpha-olefins include 4-methyl-1-pentene, 3-methyl-1-pentene, and 3,5,5-trimethyl-1-hexene.

Preferred optional non-conjugated dienes include 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopentadiene (DCPD), and combinations thereof.

Typically, propylene-based polymer backbones useful in this disclosure are obtained by using catalysts that allow control of polymer tacticity. Generally these catalysts are used in combination with comonomers and/or the polymerization temperature to manipulate the level of tacticity. Useful catalysts are typically those that are capable of a level of stereoregular placement, generally by suitable chirality of a single site catalyst. Such catalysts are typically a transition metal complex generally containing a transition metal from Group 3, 4, 5, 6, 7, 8, 9 or 10 of the Periodic Table; and at least one ancillary ligand that remains bonded to the transition metal during polymerization. Preferably, the transition metal is used in a reduced cationic state and stabilized by a co-catalyst or activator. The ancillary ligand may be a structure capable of forming a π bond such as cyclopentadienyl type ring structure. The ancillary ligand may also be a pyridinyl or amide ligand. The transition metal is preferably of Group 4 of the Periodic Table such as titanium, hafnium, or zirconium, which is preferably used in polymerization in the d0 monovalent cationic state and preferably has one or two ancillary ligands. For coordination polymerizations, such catalysts typically have a ligand capable of abstraction and a ligand into which the ethylene (olefinic) group can be inserted. All numbers and references to the Periodic Table of Elements are based on the new notation as set out in *Chemical and Engineering News,* 63(5), 27 (1985).

Pyridine amine complexes, such as those described in WO 03/040201, are also useful to produce the propylene-based polymer backbones described herein. The catalyst may be a fluxional complex, which undergoes periodic intra-molecular re-arrangement so as to provide the desired interruption of stereoregularity, as in U.S. Pat. No. 6,559,262. The catalyst may be a stereorigid complex with mixed influence on propylene insertion, see European Patent No. 1 070 087. The catalyst described in European Patent No. 1 614 699 could also be used for the production of backbones suitable for the present invention.

In another embodiment, the propylene-based polymer backbone may comprise copolymers prepared according the procedures in WO 02/36651. Likewise, the propylene-based polymer backbone may comprise polymers consistent with those described in WO 03/040202, WO 03/040095, WO 03/040201, WO 03/040233, and/or WO 03/040442. Additionally, the propylene-based polymer backbone may comprise polymers consistent with those described in European Patent No. 1 233 191, and U.S. Pat. No. 6,525,157.

The propylene-based polymer backbone may be produced via a single site catalyst polymerization process or a process involving two or more single site catalysts. In some embodiments, the single site catalyst incorporates hafnium. The propylene-based polymer backbone may be produced in a single reactor process or be produced in a process using either series reactors or parallel reactors. In the latter case, the polymers produced in the two reactors may have the same composition or different compositions.

The propylene-based polymer backbone may be a homopolymer which contains a certain number of errors resulting from stereo or regio insertion errors during propylene polymerization; these errors allow reduction in crystallinity and melting point. The propylene-based polymer backbone can also be a copolymer. In this case, the crystallinity and melting point reduction result from either propylene insertion errors or from the introduction of one, two, or three co-monomers. Generally, the propylene-based polymer will mainly comprise propylene in sufficient amounts for the propylene sequences to crystallize and have a detectable heat of fusion. This is in contrast with known traditional Ziegler-Natta elastomeric polymers, based on ethylene and propylene, in which the heat of fusion can be attributed to ethylene-derived polymer sequences as they lack the propylene tacticity.

Preferred propylene-based polymer backbones may have average propylene content on a molar basis of from about 68 to about 95 mol %, and preferably from about 70 to about 92 mol %. The balance of the propylene-based polymer backbone can be ethylene and/or one or more alpha-olefins (including ethylene) and/or have from 4 to 8 carbon atoms as specified above, preferably ethylene, and optionally contains one or more non-conjugated diene monomers.

Preferably, the propylene-based polymer backbone comprises about 5 to about 32 mol %, of a $C_2$ and/or a $C_4$-$C_{20}$ olefin, more preferably from about 8 to about 30 mol %, more preferably about 11 to about 28 mol %, with about 13 to about 25 mol % being still more preferred. Too much comonomer in the propylene-based polymer backbone will reduce the crystallinity provided by the crystallization of stereoregular propylene-derived sequences to the point where the material lacks elastic recovery; too little, and the material will be too crystalline, have a high melting point and insufficient elasticity.

More preferably, the propylene-based polymer backbone comprises about 8 to about 32 mol % ethylene, more preferably from about 9 to about 28 mol % ethylene, even more preferably from about 12 to about 25 mol % ethylene, with about 15 to about 23 mol % ethylene being still more preferred.

More preferably, the propylene-based polymer backbone comprises about 5 to about 24 wt % of ethylene, more preferably from about 9 to about 21 wt %, with about 10 to about 16 wt % being still more preferred.

In another embodiment, the propylene-based polymer backbone preferably comprises about 3 to about 24 wt %, of a $C_2$ and/or a $C_4$-$C_{20}$ olefin, more preferably from about 7 to about 21 wt %, with about 9 to about 18 wt % being still more preferred.

Optionally, the propylene-based polymer backbone comprises about 0.1 to about 10 mol % of a non-conjugated diene, more preferably from about 0.5 to about 7 mol %, more preferably about 1 to about 5 mol %, with about 2 to about 4 mol % being still more preferred.

Preferably, the propylene-based polymer backbone comprises about 0.3 to about 24 wt % of a non-conjugated diene, more preferably from about 1.5 to about 18 wt %, more preferably about 3 to about 14 wt %, with about 5 to about 13 wt % being still more preferred.

Preferably, the propylene-based polymer backbone comprises about 0.1 to about 10 mol % 5-ethylidene-2-norbornene, more preferably from about 0.5 to about 7 mol %, more preferably about 1 to about 5 mol %, with about 2 to about 4 mol % 5-ethylidene-2-norbornene being still more preferred.

Preferably, the propylene-based polymer backbone comprises about 0.3 to about 24 wt %, 5-ethylidene-2-norbornene, more preferably from about 1.5 to about 18 wt %, with about 2 to about 11 wt % 5-ethylidene-2-norbornene being still more preferred.

The propylene-based polymer backbone may have a weight average molecular weight ($M_w$) of 5,000,000 g/mol or less, a number average molecular weight ($M_n$) of about 3,000,000 or less, a z-average molecular weight ($M_z$) of about 10,000,000 g/mol or less, and a g' index of 0.95 or greater measured at the weight average molecular weight (Mw) of the polymer using isotactic polypropylene as the baseline, all of which may be determined by size exclusion chromatography, e.g., 3D SEC, also referred to as GPC-3D. For use herein, the g' index is defined as:

$$g' = \frac{\eta_b}{\eta_l}$$

where $\eta_b$ is the intrinsic viscosity of the propylene-based polymer backbone and $\eta_l$ is the intrinsic viscosity of a linear polymer of the same viscosity-averaged molecular weight ($M_v$) as the propylene-based polymer backbone. $\eta_l = KM_v^\alpha$, K and $\alpha$ were measured values for linear polymers and should be obtained using the same instrument as the one used for the g' index measurement.

In a preferred embodiment, the propylene-based polymer backbone may have a $M_w$ of about 5,000 to about 5,000,000 g/mol, more preferably a $M_w$ of about 10,000 to about 1,000,000 g/mol, more preferably a $M_w$ of about 20,000 to about 500,000 g/mol, and more preferably a $M_w$ of about 50,000 to about 300,000 g/mol.

In a preferred embodiment, the propylene-based polymer backbone may have a $M_n$ of about 2,500 to about 3,000,000, more preferably a $M_n$ of about 5,000 to about 500,000, more preferably a $M_n$ of about 10,000 to about 250,000, and more preferably a $M_n$ of about 25,000 to about 150,000.

In a preferred embodiment, the propylene-based polymer backbone may have a $M_z$ of about 10,000 to about 10,000,000 g/mol, more preferably a $M_z$ of about 20,000 to about 2,000,000 g/mol, more preferably a $M_z$ of about 40,000 to about 1,000,000 g/mol, and more preferably a $M_z$ of about 100,000 to about 600,000 g/mol.

The molecular weight distribution index (MWD=(Mw/Mn)), sometimes referred to as a "polydispersity index" (PDI), of the propylene-based polymer backbone may be about 1.5 to about 40.0. In an embodiment, the MWD may have an upper limit of about 40, or about 20, or about 10, or about 5, or about 4.5, and a lower limit of about 1.5, or about 1.8, or about 2.0. In a preferred embodiment, the MWD of the propylene-based polymer backbone is about 1.8 to about 5 and more preferably about 1.8 to about 3. Techniques for determining the molecular weight (Mn and Mw) and molecular weight distribution (MWD) may be found in U.S. Pat. No. 4,540,753 (Cozewith, Ju and Verstrate) and references cited therein, in *Macromolecules*, 1988, volume 21, p 3360 (Verstrate et al.) and references cited therein, and in accordance with the procedures disclosed in U.S. Pat. No. 6,525,157, column 5, lines 1-44.

In a preferred embodiment, the propylene-based polymer backbone may have a crystallization temperature ($T_c$) measured with DSC of about 200° C. or less, more preferably, about 150° C. or less, with about 140° C. or less being more preferred.

In a preferred embodiment, the propylene-based polymer backbone may have a density of about 0.85 to about 0.92 g/cm$^3$, more preferably about 0.87 to about 0.90 g/cm$^3$, more preferably about 0.88 to about 0.89 g/cm$^3$ at room temperature (about 23° C.) as measured per the ASTM D-1505 test method.

In another embodiment, the propylene-based polymer backbone may have a melt flow rate (MFR) (ASTM D-1238, 230° C., 2.16 kg), which is inversely related to weight average molecular weight ($M_w$), equal to or greater than about 0.2 g/10 min, preferably from about 0.5 to about 200 g/10 min and more preferably from about 1 to about 100 g/10 min. In another embodiment, the propylene-based polymer backbone preferably has an MFR of about 0.5 to about 200 g/10 min, especially from about 2 to about 30 g/10 min, more preferably from about 5 to about 30 g/10 min, more preferably about 10 to about 30 g/10 min or more especially about 10 to about 25 g/10 min. In yet another embodiment, the propylene-based polymer backbone has a melt flow rate, of about 1.0 to about 15 g/10 min, more preferably about 1.0 to about 13 g/10 min, more preferably about 1.0 to about 12 g/10 min, and more preferably about 1.0 to about 11 g/10 min.

The Differential Scanning Calorimetry (DSC) procedure can be used to determine heat of fusion and melting temperature of the propylene-based polymer backbone. The method is as follows: about 0.5 grams of polymer is weighed out and pressed to a thickness of about 15-20 mils (about 381-508 microns) at about 140° C.-150° C., using a "DSC mold" and Mylar as a backing sheet. The pressed pad is allowed to cool to ambient temperature by hanging in air (the Mylar is not removed). The pressed pad is annealed at room temperature (about 23-25° C.) for about 8 days. At the end of this period, an about 15-20 mg disc is removed from the pressed pad using a punch die and is placed in a 10 microliter aluminum sample pan. The sample is placed in a Differential Scanning Calorimeter (Perkin Elmer Pyris 1 Thermal Analysis System) and is cooled to about −100° C. The sample is heated at about 10° C./min to attain a final temperature of about 165° C. The thermal output, recorded as the area under the melting peak of the sample, is a measure of the heat of fusion and can be expressed in Joules per gram (J/g) of polymer and is automatically calculated by the Perkin Elmer System. Under these conditions, the melting peak shows 2 maxima, the maxima at the highest temperature is taken as the melting point within the range of melting of the sample relative to a baseline measurement for the increasing heat capacity of the polymer as a function of temperature.

In a preferred embodiment, the propylene-based polymer backbone may have a heat of fusion ($\Delta H_f$), determined by the method described above, which is greater than or equal to about 0.5 J/g, and is less than or equal to about 75 J/g, preferably less than or equal to about 50 J/g, more preferably less than or equal to about 35 J/g. Also the propylene-based polymer backbone preferably has a heat of fusion that is greater than or equal to about 1 J/g, and preferably greater than or equal to about 5 J/g according to the procedure described above. In another embodiment, the propylene-based polymer backbone may have a heat of fusion ($\Delta H_f$) which is from about 0.5 to about 75 J/g, preferably from about 1.0 to about 70 J/g, more preferably from about 1.0 to about 35 J/g. Preferred propylene polymers and compositions may be characterized in terms of both their melting points ($T_m$) and heats of fusion, which properties can be influenced by the presence of comonomers or steric irregularities that hinder the formation of crystallites by the polymer chains. The heat of fusion preferably ranges from a lower limit of about 1.0 J/g, or about 1.5 J/g, or about 3.0 J/g, or about 4.0 J/g, or about 6.0 J/g, or about 7.0 J/g, to an upper limit of about 30 J/g, or about 40 J/g, or about 50 J/g, or about 60 J/g or about 70 J/g.

For use herein, the crystallinity of the propylene-based polymer backbone can also be expressed in terms of percentage of crystallinity (% crystallinity). In a preferred embodiment, the propylene-based polymer backbone has a % crystallinity of from about 0.5 to about 40, preferably about 1 to about 30, more preferably about 5 to about 25, wherein % crystallinity is determined according to the DSC procedure described above. The thermal energy for the highest order of polypropylene is estimated at about 189 J/g (i.e., 100% crystallinity is equal to 189 J/g.). In another embodiment, the propylene-based polymer backbone preferably has a crystallinity of less than about 40%, preferably about 0.25% to about 25%, more preferably from about 0.5% to about 22%, and most preferably from about 0.5% to about 20%.

In addition to this level of crystallinity, the propylene-based polymer backbone preferably has a single broad melting transition. However, the propylene-based polymer backbone may show secondary melting peaks adjacent to the principal peak, but for purposes herein, such secondary melting peaks are considered together as a single melting point, with the highest of these peaks being considered the melting point of the propylene-based polymer backbone.

The propylene-based polymer backbone preferably has a melting point, as measured by DSC, of equal to or less than about 120° C., more preferably less than about 115° C., more preferably less than about 105° C., preferably less than about 90° C., preferably less than about 80° C., more preferably less than or equal to about 75° C., preferably from about 25° C. to about 80° C., preferably about 25° C. to about 75° C., more preferably about 30° C. to about 65° C.

The propylene-based polymer backbone may have a Mooney viscosity, ML (1+4)@125° C., as determined according to ASTM D-1646, of less than about 100, more preferably less than about 75, even more preferably less than about 60, most preferably less than about 30.

In another embodiment, useful propylene-based polymer backbones include random copolymers of propylene having a heat of fusion of less than about 70 J/g, an MFR of about 50 g/10 min or less, and containing stereoregular propylene crystallinity, preferably isotactic stereoregular propylene crystallinity. In another embodiment, the polymer is a random copolymer of propylene and at least one comonomer selected from ethylene, $C_4$-$C_{20}$ α-olefins, and combinations thereof. Preferably the random copolymer of propylene comprises from about 5 wt % to about 25 wt % polymerized ethylene units and about 0.1 wt % to about 10 wt % non-conjugated diene units, based on the total weight of the polymer; has a melting point ($T_m$) of from about 25° C. to about 120° C., or from about 35° C. to about 80° C.; has a heat of fusion within the range having an upper limit of about 70 J/g, preferably about 60 J/g, more preferably about 50 J/g and most preferably about 40 J/g and a lower limit of about 1 J/g or about 3 J/g; has a molecular weight distribution Mw/Mn of from about 1.8 to about 4.5; and has a melt flow rate of less than about 40 g/10 min, or less than about 20 g/10 min (ASTM D-1238, 230° C., 2.16 kg).

In another embodiment, the propylene-based polymer backbone may comprise a blend of two or more propylene-based polymer backbones differing in the olefin content, diene content, or both. Preferably, one propylene-based polymer backbone may comprise about 7 to about 13 mol % olefin and optionally about 1 to about 2 mol % diene, while the other propylene-based polymer backbone may comprise about 14 to about 22 mol % olefin, and optionally about 2 to about 4 mol % diene.

The Grafting Monomer

The grafting monomer is preferably at least one ethylenically unsaturated carboxylic acid or acid derivative, such as an acid anhydride, ester, salt, amide, imide, or the like. Such monomers include but are not necessary limited to the following: acrylic acid, methacrylic acid, maleic acid, fumaric acid, itaconic acid, citraconic acid, mesaconic acid, maleic anhydride, 4-methyl cyclohex-4-ene-1,2-dicarboxylic acid anhydride, bicyclo(2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophtalic anhydride, norborn-5-ene-2,3-dicarboxylic acid anhydride, nadic anhydride, methyl nadic anhydride, himic anhydride, methyl himic anhydride, and x-methylbicyclo(2.2.1)hept-5-ene-2,3-dicarboxylic acid anhydride (XMNA). More preferably the grafting monomer is one of: maleic anhydride, methyl methacrylate, acrylic acid, methacrylic acid, hydroxyethyl methacrylate, hydroxypropyl methacrylate, glycidyl methacrylate or any combinations thereof. Maleic anhydride (MAH) is the most preferred grafting monomer.

In a preferred grafted polymer, the grafted monomer concentration is generally in the range of about 0.1 to about 6 wt %, preferably at least about 0.5 wt % and most preferably about 1.5 wt %. The MFR of the grafted polymer is about 25 g/10 min (at 190° C., 1.2 kg) or less, more preferably about 20 g/10 min or less, most preferably below about 15 g/10 min.

Preparing the Grafted Propylene-Based Polymer

The grafted propylene-based polymer may be prepared in solution, in a fluidized bed reactor, or by melt grafting as desired. A particularly preferred grafted propylene-based polymer may be conveniently prepared by melt blending the ungrafted propylene-based polymer, in the substantial absence of a solvent, with a free radical generating catalyst, such as a peroxide catalyst, in the presence of the grafting monomer in a shear-imparting reactor, such as an extruder reactor. Single screw but preferably twin screw extruder reactors such as co-rotating intermeshing or counter-rotating non-intermeshing extruders but also co-kneaders such as those sold by Buss (Carol Stream, Ill., USA) are especially preferred.

The preferred sequence of events used for the grafting reaction consists of melting the propylene-based polymer backbone composition, adding and dispersing the grafting monomer, introducing the peroxide and venting the unreacted monomer and by-products resulting from the peroxide decomposition. Other sequences may include feeding the monomers and the peroxide pre-dissolved in a solvent. The monomer is typically introduced to the reactor at a rate of about 0.01 to about 10 wt % of the total of the polymeric composition and monomer, and preferably at about 1 to about 5 wt % based on the total reaction mixture weight.

The grafting reaction is carried out at a temperature selected to minimize or avoid rapid vaporization and consequent losses of the catalyst and monomer and to have residence times about 6 to 7 times the half life time of the peroxide. A temperature profile wherein the temperature of the polymer melt increases gradually through the length of the reactor up to a maximum in the grafting reaction zone of the reactor, and then decreases toward the reactor output, is preferred. Temperature attenuation in the last sections of the extruder is desirable for product pelletizing purposes.

In order to optimize the consistency of feeding, the peroxide is usually dissolved at an approximate 10% concentration in a mineral oil whereas the polymer and the grafting monomer are fed neat. Specific examples of useful catalysts include: diacyl peroxides such as benzoyl peroxide; peroxyesters such as tert-butyl peroxy benzoate, tert-butylperoxy acetate, OO-tert-butyl-O-(2-ethylhexyl)monoperoxy carbonate; peroxyketals such as n-butyl 4,4-di-(tert-butylperoxy) valerate; and dialkyl peroxides such as 1,1-bis(tert-butylperoxy)cyclohexane, 1,1-bis(tert-butylperoxy)-3,3,5-trimethylcyclohexane, 2,2-bis(tert-butylperoxy)butane, dicumylperoxide, tert-butylcumylperoxide, a,a'-bis(tert-butylperoxy-isopropyl)benzene, di-tert-butylperoxide (DTBP), 2,5-dimethyl-2,5-di(tert-butylperoxy)-hexane, 2,5-dimethyl-2,5-di (tert-butylperoxy)-hexane; mixed peroxides such as 3,3,5,7, 7-pentamethyl, 1,2,4-trioxepane, and the like.

Properties of Grafted Propylene-Based Polymer

The maleic anhydride (MA) content of the grafted material is preferably measured by Fourier Transform Infrared Spectroscopy (FTIR), the process of which is as follows. A thin polymer film is pressed from 2-3 pellets at about 165° C. When the film is used as such, the maleic anhydride content is reported as before oven. The film is then placed in a vacuum oven at about 105° C. for about 1 hour and placed in the FTIR; the measured maleic anhydride content is reported as after oven. The peak height of the anhydride absorption band at 1790 cm$^{-1}$ ($A_{1790}$) and of the acid absorption band (from anhydride hydrolysis in air) at 1712 cm$^{-1}$ ($A_{1712}$) was compared with a band at 4324 cm$^{-1}$ ($A_{4324}$) serving as a standard. The total percentage of maleic anhydride (% MA) was then calculated by the formula:

$$\% MA = a + k(A_{1790} + A_{1712})/A_{4324},$$

where "a" and "k" are constants determined by internal calibration with internal standards and having values 0.078 and 0.127, respectively.

The maleic anhydride content of the grafted propylene-based polymers used as standards was determined according to following procedure. A sample of grafted polymer was first purified from residual monomer by complete solubilization in xylene followed by re-precipitation in acetone. This precipitated polymer was then dried in a vacuum oven at 200° C. for 2 hours in order to convert all maleic acid into anhydride. 0.5 to 1 grams of re-precipitated polymer was dissolved in 150 mL of toluene. The solution was heated at toluene reflux for 1 hour and 5 drops of a 1% bromothymol blue solution in MeOH were added. The solution was titrated with a solution of 0.1 N tetrabutyl ammonium hydroxide in methanol (color change from yellow to blue). The amount of the tetrabutyl ammonium hydroxide solution used to neutralize the anhydride during the titration was directly proportional to the amount of grafted maleic anhydride present in the polymer.

The Mooney viscosity of the grafted propylene-based polymer is preferably measured according to ASTM D1646, [ML (1+4) @ 125° C.]. The grafted propylene-based polymer may have a Mooney viscosity, ML (1+4)@125° C., of less than about 100, more preferably less than about 75, even more preferably less than about 60, most preferably less than about 30.

In a preferred embodiment, the grafted propylene-based polymer has a DSC melting temperature of about 105° C. or less and a heat of fusion of about 75 J/g or less. In another preferred embodiment, the grafted propylene-based polymer has a DSC melting point of preferably about 105° C. or less, more preferably about 100° C. or less, more preferably 90° C. or less, more preferably about 85° C. or less, and most preferably about 75° C. or less. Alternately, the grafted propylene-based polymer has a DSC melting point of preferably from about 25° C. to about 80° C., preferably about 25° C. to about 75° C., more preferably about 30° C. to about 65° C.

In a preferred embodiment, the grafted propylene-based polymer has a heat of fusion ($\Delta H_f$), determined by the method described herein, which is greater than or equal to about 0.5 J/g, and is less than or equal to about 75 J/g, preferably less than or equal to about 50 J/g, more preferably less than or equal to about 35 J/g. In another embodiment, the grafted propylene-based polymer preferably has a heat of fusion of about 75 J/g or less, more preferably about 70 J/g or less, more preferably about 65 J/g or less, and most preferably about 60 J/g or less. In yet another embodiment, the grafted propylene-based polymer may preferably have a heat of fusion that is greater than or equal to about 1 J/g, and preferably greater than or equal to about 5 J/g. In still another embodiment, the grafted propylene-based polymer may have a heat of fusion which is from about 0.5 to about 75 J/g, preferably from about 1.0 to about 70 J/g, more preferably from about 1.0 to about 35 J/g. The heat of fusion also preferably ranges from a lower limit of about 1.0 J/g, or about 1.5 J/g, or about 3.0 J/g, or about 4.0 J/g, or about 6.0 J/g, or about 7.0 J/g, to an upper limit of about 30 J/g, or about 40 J/g, or about 50 J/g, or about 60 J/g or about 70 J/g.

In a preferred embodiment, the grafted propylene-based polymer preferably has a Melt Index (MI) (according to ASTM D-1238, 2.16 kg @ 190° C.) of less than about 7 g/10 min, more preferably about 6.5 g/10 min or less, more preferably about 6 g/10 min or less, more preferably about 5.5 g/10 min or less, and most preferably about 5 g/10 min or less.

In a preferred embodiment, the grafted propylene-based polymer preferably has a crystallization temperature (Tc), measured with DSC, of about 200° C. or less, more preferably about 150° C. or less, with about 140° C. or less being more preferred.

In a preferred embodiment, the grafted propylene-based polymer may have a density of about 0.85 to about 0.92 g/cm$^3$, more preferably about 0.87 to about 0.90 g/cm$^3$, more preferably about 0.88 to about 0.89 g/cm$^3$, at room temperature (about 23° C.) as measured per ASTM D-1505.

In another embodiment, the grafted propylene-based polymer may have a melt flow rate (MFR) (ASTM D-1238, 230° C., 2.16 kg), which is inversely related to weight average molecular weight (Mw), equal to or greater than about 0.2 g/10 min, preferably from about 0.5 to about 200 g/10 min and more preferably from about 1 to about 100 g/10 min. In another embodiment, the grafted propylene-based polymer preferably has an MFR of about 0.5 to about 200 g/10 min, especially from about 2 to about 30 g/10 min, more preferably from about 5 to about 30 g/10 min, more preferably about 10 to about 30 g/10 min or more especially about 10 to about 25 g/10 min. In yet another embodiment, the grafted propylene-based polymer has a melt flow rate, of about 1.0 to about 15 g/10 min, more preferably about 1.0 to about 13 g/10 min, more preferably about 1.0 to about 12 g/10 min, and more preferably about 1.0 to about 11 g/10 min.

Alternatively, the grafted polymer can be produced by grafting a blend of 2 or 3 polymers. In this embodiment, the propylene-based polymer backbone can be blended with another propylene-based polymer backbone having either the same composition and a different molecular weight or a similar molecular weight and a different composition or a different molecular weight and a different composition. The polymer blend is then grafted. The grafted propylene-based polymer can also be blended with polypropylene (homopolymer, random copolymer, or impact copolymer, also called heterophasic PP) prior to grafting for the production of the grafted component of the tie layer. The grafted propylene-based polymer can also be blended with polyethylene (LDPE, LLDPE, HDPE, VLDPE) or plastomers or ethylene alpha-olefin copolymers prior to grafting for the production of the grafted component of the tie layer. In one embodiment, the tie layer further comprises an ethylene alpha-olefin copolymer in an amount of about 1-99 wt %, preferably about 5-95 wt %, more preferably about 10-90 wt %, and most preferably about 20-80 wt % based upon the weight of the ethylene alpha-olefin copolymer and the grafted propylene-based polymer.

In another embodiment, the propylene-based polymer backbone is combined with another polymer before or after contacting with the grafting monomer. For example the propylene-based polymer backbone may be combined with a random propylene polymer or ethylene copolymer and thereafter contacted with the grafting monomer, producing a composition where all polymers are grafted with the grafting monomer. Alternately, the propylene-based polymer backbone is contacted with the grafting monomer and then combined with one or more other polymers, such as a random propylene polymer or ethylene copolymer. Preferred polymers to be combined with propylene-based polymer backbone before or after contact with the grafting monomer include random propylene polymers having a melting point of about 105° C. or less and a heat of fusion of about 70 J/g or less, and/or ethylene copolymers having a density of about 0.915 g/cc or less.

In a particularly preferred embodiment, the ethylene copolymer is an ethylene-based plastomer. Preferred ethylene-based plastomers are preferably a copolymer comprising at least about 50 wt % ethylene, and having up to about 50 wt %, preferably about 1 to about 35 wt %, even more preferably about 1 to about 6 wt % of a $C_3$-$C_{20}$ comonomer, based upon the weight of the copolymer (preferably propylene, butene, hexene and/or octene). Several such suitable products are commercially available from ExxonMobil Chemical Company in Baytown, Tex., USA, under the trade name EXACT™.

In another particularly preferred embodiment, the ethylene copolymer has a melting point of about 100° C. or less, preferably about 80° C. or less, preferably about 60° C. or less, preferably about 40° C. or less and, optionally, a heat of fusion of less than about 70 J/g, preferably about 50 J/g or less, preferably about 30 J/g or less. In another preferred embodiment, the ethylene copolymer has a density of about 0.85-0.915 g/cc (preferably about 0.855-0.90 g/cc, preferably about 0.86-0.89 g/cc, preferably about 0.86-0.88 g/cc). Alternate preferred ethylene copolymers may have a density of about 0.89 g/cc or less, preferably about 0.88 g/cc or less, and preferably about 0.87 g/cc or less. In another particularly preferred embodiment, the ethylene copolymer has a Mw/Mn of about 5 or less, preferably about 4 or less, preferably from about 1 to about 3, preferably from about 1.5 to about 2.5, preferably from about 1.5 to about 2.2.

In further embodiments, the tie layer may additionally comprise one or more additives such as opacifying agents, pigments, colorants, cavitating agents, slip agents, antioxidants, anti-fog agents, anti-static agents, anti-block agents, fillers, moisture barrier additives, gas barrier additives, and combinations thereof, as discussed in further detail below.

The thickness of the tie layer is typically in the range of from about 0.50 to 25 µm, preferably from about 0.50 µm to about 12 µm, more preferably from about 0.50 µm to about 6 µm, and most preferably from about 2.5 µm to about 5 µm. However, in some thinner films, the tie layer thickness may be from about 0.5 µm to about 4 µm, or from about 0.5 µm to about 2 µm, or from about 0.5 µm to about 1 µm.

First Skin Layer

In some embodiments, the film comprises a first skin layer. In one embodiment, the first skin layer is a barrier layer. Typically, the function of a skin layer in a film is to provide high barrier properties, good sealability, and high surface energy contributing to improved printability, coatability, metallization, lamination, and/or subsequent adhesion to other substrates. A barrier layer typically reduces the transmission rate of one or more components—for example, gases or vapors—through the film. Accordingly, the barrier layer of a film that is made into a package will help to exclude one or more components from the interior of the package—or conversely to maintain one or more gases or vapors within the package.

In some embodiments, the first skin layer is contiguous to the first tie layer. In other embodiments, one or more other layers may be intermediate the first tie layer and the first skin layer. The first skin layer, for high surface energy, includes at least one polymer selected from ethylene-based polar polymers and polar modified polyolefins having a polar monomer copolymerized therein, olefin polymers or copolymers grafted with acids or anhydrides, or derivatives thereof. Suitable exemplary polymers comprise, but are not limited to, ethylene vinyl alcohol (EVOH), poly vinyl alcohol (PVOH), ethylene acrylate (EA) copolymers, anhydride-modified EA, acid terpolymers containing ester and acrylic functionalities, polar-modified PP such as maleic anhydride grafted polypropylene (PP-MAH) and glycidyl methacrylate modified PP (PP-GMA), random terpolymers of ethylene/acrylic ester/glycidyl methacrylate, and blends thereof. Preferred copolymers are EVOH. A suitable EVOH copolymer is EVAL™ G176B (commercially available from Kuraray Company Ltd. of Japan). Preferred grafted polymers are Orevec™ adhesive resins and a suitable grade is Orevec™ SM7-001-sPP (commercially available from Arkema Company Inc. of France).

In some embodiments, the first skin layer may include a polymer that is suitable for heat-sealing or bonding to itself when crimped between heated crimp-sealer jaws. Commonly, suitable skin layer polymers include copolymers or terpolymers of ethylene, propylene, and butylene and may have DSC melting points either lower than or greater than the DSC melting point of the first tie polymer. In some preferred embodiments, the first skin layer comprises at least one polymer selected from the group consisting of propylene homopolymer, ethylene-propylene copolymer, butylene homopolymer and copolymer, ethylene-propylene-butylene (EPB) terpolymer, ethylene vinyl acetate (EVA), metallocene-catalyzed propylene homopolymer, and combinations thereof. An example of a suitable EPB terpolymer is Chisso 7794 (commercially available from Chisso Corporation of Japan).

In some embodiments, heat sealable blends can be utilized in providing the first skin layer. Thus, along with the skin layer polymers identified above there can be, for example, other polymers, such as polypropylene homopolymer, e.g., one that is the same as, or different from, the iPP of the core layer. The first skin layer may additionally or alternatively include materials selected from the group consisting of ethylene-propylene random copolymers, low-density polyethylene (LDPE), linear low density polyethylene (LLDPE), medium density polyethylene (MDPE), and combinations thereof.

In some embodiments, the first skin layer comprises at least one polymer selected from the group consisting of a polyethylene (PE) polymer or copolymer, a polypropylene polymer or copolymer, an ethylene-propylene copolymer, an EPB terpolymer, a propylene-butylene (PB) copolymer, and combinations thereof. Preferably, the PE polymer is high-density polyethylene (HDPE), such as HD-6704.67 (commercially available from ExxonMobil Chemical Company of Baytown, Tex., USA), M-6211 or HDPE M-6030 (commercially available from Equistar Chemical Company of Houston, Tex., USA). A suitable ethylene-propylene copolymer is Fina 8573 (commercially available from Fina Oil Company of Dallas, Tex., USA). Preferred EPB terpolymers include Chisso 7510 and 7794 (commercially available from Chisso Corporation of Japan). For coating and printing functions, the first skin layer may preferably comprise a copolymer that has been surface treated. For metallized barrier properties, a HDPE, a PB copolymer, PP, or combinations thereof may be preferred.

The first skin layer may also comprise processing aid additives, such as anti-block agents, anti-static agents, slip agents and combinations thereof, as discussed in further detail below.

The thickness of the first skin layer is typically in the range of from about 0.10 μm to about 7.0 μm, preferably about 0.10 μm to about 4 μm, and most preferably about 0.10 μm to about 3 μm. In some film embodiments, the first skin layer thickness may be from about 0.10 μm to about 2 μm, about 0.10 μm to about 1 μm, or about 0.10 μm to about 0.50 μm. In some commonly preferred film embodiments, the first skin layer has a thickness in the range of from about 0.5 μm to about 2 μm, about 0.5 μm to about 3 μm, or about 1 μm to about 3.5 μm.

Second Skin Layer

A second skin layer is optional and, when present, is provided on the opposite side of the core layer from the first skin layer. The second skin layer may be contiguous to the core layer or contiguous to one or more other layers positioned intermediate the core layer and the second skin layer. The second skin layer may be provided to improve the film's heat sealability, barrier properties, processability, printability, and/or compatibility for metallization, coating, and lamination to other films or substrates.

All of the polymers described herein as polymers useful in the first skin layer may be employed as the second skin layer polymer. In certain embodiments, the multiple layer film structures may incorporate two skin layers comprising the same polymer components. Such films may be particularly useful if both sides require the same functionalities. The two skin layers may also comprise different polymer components and have different applications such as metallization on one side and heat sealing on the other side. Preferred functions of the second skin layer are heat sealabilty and printability.

In some embodiments, the second skin layer comprises at least one polymer selected from the group consisting of a PE polymer or copolymer, a PP polymer or copolymer, an ethylene-propylene copolymer, an EPB terpolymer or a PB copolymer, ethylene vinyl acetate (EVA), and combinations thereof. Preferably, the PE polymer is high-density polyethylene (HDPE), such as HD-6704.67 (commercially available from ExxonMobil Chemical Company of Baytown, Tex., USA), M-6211 or HDPE M-6030 (commercially available from Equistar Chemical Company of Houston, Tex., USA). A suitable ethylene-propylene copolymer is Fina 8573 (commercially available from Total Petrochemicals, Houston, Tex., USA). Preferred EPB terpolymers include Chisso 7510 and 7794 (commercially available from Chisso Corporation of Japan). For coating and printing functions, the second skin layer may preferably comprise a copolymer that has been surface treated. For metallized barrier properties, a HDPE, a PB copolymer, PP, or combinations thereof may be preferred.

The second skin layer may also comprise processing aid additives, such as anti-block agents, anti-static agents, slip agents and combinations thereof, as discussed in further detail below.

The thickness of the second skin layer depends upon the intended function of the second skin layer, but is typically in the range of from about 0.50 μm to about 3.5 μm, preferably from about 0.50 μm to about 2 μm, and in many embodiments is from about 0.50 µm to about 1.5 µm. Also, in thinner film embodiments, the second skin layer thickness may range from about 0.50 µm to about 1.0 µm, or about 0.50 µm to about 0.75 µm.

Second Tie Layer

A second tie layer is optional and when present is located intermediate the core layer and the optional second skin layer. In one embodiment, the second tie layer comprises a blend of propylene homopolymer and, optionally, at least one grafted propylene-based polymer, as described above. The propylene homopolymer is preferably an iPP and may be grafted with any of the grafting monomers described herein. The grafted propylene-based polymer comprises at least about 10 wt % of the second tie layer, preferably at least about 30 wt % of the second tie layer, more preferably at least about 50 wt % of the tie layer, and most preferably at least about 90 wt % of the second tie layer. In some preferred embodiments, the second tie layer is an adhesion promoting material such as ADMER™ AT1179A (commercially available from Mitsui Chemicals America Inc. of Purchase, N.Y., USA), a maleic anhydride modified polypropylene.

In one embodiment, the second tie layer and the first tie layer may be made from the same material. In another embodiment, the second tie layer and the first tie layer may be made from different materials.

The second tie layer may further comprise one or more additives such as opacifying agents, pigments, colorants, cavitating agents, slip agents, antioxidants, anti-fog agents, anti-static agents, anti-block agents, fillers, moisture barrier additives, gas barrier additives, and combinations thereof, as discussed in further detail below.

The thickness of the second tie layer is in the range of from about 0.5 µm to about 25 µm, preferably from about 1 µm to about 12 µm, and most preferably from about 1 µm to about 10 µm. Also, the thickness may be from about 0.5 µm to about 8 µm, or about 1 µm to about 6 µm, or about 1 µm to about 4 µm.

Additives

Additives may be present in one or more layers of the multi-layer films of this disclosure. Examples include, but are not limited to, opacifying agents, pigments, colorants, cavitating agents, slip agents, antioxidants, anti-fog agents, anti-static agents, anti-block agents, fillers, moisture barrier additives, gas barrier additives, and combinations thereof. Such additives may be used in effective amounts, which vary depending upon the application and the property desired.

Examples of suitable opacifying agents, pigments or colorants include iron oxide, carbon black, aluminum, titanium dioxide ($TiO_2$), calcium carbonate ($CaCO_3$), polybutylene terephthalate (PBT), talc, beta nucleating agents, and combinations thereof.

Cavitating or void-initiating additives may include any suitable organic or inorganic material that is incompatible with the polymer material(s) of the layer(s) to which it is added, at the temperature of biaxial orientation, in order to create an opaque film. Examples of suitable void-initiating particles are PBT, nylon, solid or hollow pre-formed glass spheres, metal beads or spheres, ceramic spheres, calcium carbonate, talc, chalk, or combinations thereof. The average diameter of the void-initiating particles typically may be from about 0.1 to about 10 µm. Cavitation may also be introduced by beta-cavitation, which includes creating beta-form crystals of polypropylene and converting at least some of the beta-crystals to alpha-form polypropylene crystals and creating a small void remaining after the conversion. Preferred beta-cavitated embodiments of the core layer may also comprise a beta-crystalline nucleating agent. Substantially any beta-crystalline nucleating agent ("beta nucleating agent" or "beta nucleator") may be used.

Slip agents may include higher aliphatic acid amides, higher aliphatic acid esters, waxes, silicone oils, and metal soaps. Such slip agents may be used in amounts ranging from about 0.1 wt % to about 2 wt % based on the total weight of the layer to which it is added. An example of a slip additive that may be useful is erucamide.

Non-migratory slip agents, used in one or more skin layers of the multi-layer films, may include polymethyl methacrylate (PMMA). The non-migratory slip agent may have a mean particle size in the range of from about 0.5 µm to about 8 µm, or about 1 µm to about 5 µm, or about 2 µm to about 4 µm, depending upon layer thickness and desired slip properties. Alternatively, the size of the particles in the non-migratory slip agent, such as PMMA, may be greater than about 20% of the thickness of the skin layer containing the slip agent, or greater than about 40% of the thickness of the skin layer, or greater than about 50% of the thickness of the skin layer. The size of the particles of such non-migratory slip agent may also be at least about 10% greater than the thickness of the skin layer, or at least about 20% greater than the thickness of the skin layer, or at least about 40% greater than the thickness of the skin layer. Generally spherical, particulate non-migratory slip agents are contemplated, including PMMA resins, such as EPOSTAR™ (commercially available from Nippon Shokubai Co., Ltd. of Japan). Other commercial sources of suitable materials are also known to exist. "Non-migratory" means that these particulates generally do not change location throughout the layers of the film in the manner of migratory slip agents. A conventional polydialkyl siloxane, such as silicone oil or gum additive having a viscosity of about 10,000 to about 2,000,000 centistokes is also contemplated.

Suitable anti-oxidants may include phenolic anti-oxidants, such as IRGANOX® 1010 (commercially available from Ciba-Geigy Company of Switzerland). Such an anti-oxidant is generally used in amounts ranging from about 0.1 wt % to about 2 wt %, based on the total weight of the layer(s) to which it is added.

Anti-static agents may include alkali metal sulfonates, polyether-modified polydiorganosiloxanes, polyalkylphenylsiloxanes, and tertiary amines. Such anti-static agents may be used in amounts ranging from about 0.05 wt % to about 3 wt %, based upon the total weight of the layer(s).

Examples of suitable anti-blocking agents may include silica-based products such as SYLOBLOC® 44 (commercially available from Grace Davison Products of Colombia, Md., USA), PMMA particles such as EPOSTAR™ (commercially available from Nippon Shokubai Co., Ltd. of Japan), or polysiloxanes such as TOSPEARL™ (commercially available from GE Bayer Silicones of Wilton, Conn., USA). Such an anti-blocking agent comprises an effective amount up to about 3000 ppm of the weight of the layer(s) to which it is added.

Fillers may include finely divided inorganic solid materials such as silica, fumed silica, diatomaceous earth, calcium carbonate, calcium silicate, aluminum silicate, kaolin, talc, bentonite, clay, wollastonite, and pulp.

Suitable moisture and gas barrier additives may include effective amounts of low-molecular weight resins, hydrocarbon resins, particularly petroleum resins, styrene resins, cyclopentadiene resins, and terpene resins.

Optionally, one or more skin layers may be compounded with a wax or coated with a wax-containing coating, for lubricity, in amounts ranging from about 2 wt % to about 15 wt % based on the total weight of the skin layer. Any conventional wax, such as, but not limited to Carnauba™ wax (commercially available from Michelman Corporation of Cincinnati, Ohio, USA) that is useful in thermoplastic films is contemplated.

Film Orientation

The embodiments of this disclosure may include uniaxially, biaxially, and un-oriented multi-layer films. Orientation in the direction of extrusion is known as machine direction (MD) orientation. Orientation perpendicular to the direction of extrusion is known as transverse direction (TD) orientation. The film may be oriented to the same or different extent in each direction. Orientation may be accomplished by stretching or pulling a film first in the MD followed by TD orientation. Blown films or cast films may also be oriented by a tenter-frame orientation subsequent to the film extrusion process, again in one or both directions. Orientation may be sequential or simultaneous, depending upon the desired film features. Preferred orientation ratios are commonly from between about three to about six times in the machine direction and between about four to about ten times in the transverse direction. Typical commercial orientation processes are biaxially oriented polypropylene (BOPP) tenter process, blown film, double bubble, and simultaneous longitudinal and transverse orientation technology (LISIM®).

Surface Treatment

One or both of the outer surfaces of the multi-layer films may be surface-treated to increase the surface energy to render the film receptive to metallization, coatings, printing inks, lamination, the like or combinations thereof. In some embodiments, at least a portion of the film is surface-treated. The surface treatment can be carried out according to any method known in the art, including but not limited to corona discharge, flame, plasma, or chemical treatment, or treatment by means of a polarized flame.

Metallization

One or both of the outer surfaces of the multi-layer films may be metallized. In one embodiment, at least a portion of the film is metallized. It may be metallized using any conventional method, such as for example vacuum metallization by deposition of a metal layer such as aluminum, copper, silver, chromium, or mixtures thereof.

Coating

In some embodiments, one or more coatings, such as for barrier, printing and/or processing purposes, may be contacted with at least a portion of the multi-layer film. Such coatings may include acrylic polymers, such as ethylene acrylic acid (EAA), ethylene methyl acrylate copolymers (EMA), polyvinylidene chloride (PVdC), poly(vinyl)alcohol (PVOH) and EVOH. The coatings are preferably applied by an emulsion coating technique, but may also be applied by co-extrusion and/or lamination. In another embodiment, the coatings include one or more of: propylene random copolymer or terpolymer or a grafted propylene-based polymer, as described above.

PVdC coatings that are suitable for use with the multi-layer films are any of the known PVdC compositions heretofore employed as coatings in film manufacturing operations, e.g., any of the PVdC materials described in U.S. Pat. Nos. 4,214,039; 4,447,494; 4,961,992; 5,019,447 and 5,057,177.

Known vinyl alcohol-based coatings, such as PVOH and EVOH, that are suitable for use with the multi-layer films include VINOL™ 125 or VINOL™ 325 (both commercially available from Air Products, Inc. of Allentown, Pa., USA). Other PVOH coatings are described in U.S. Pat. No. 5,230,963.

Before applying the coating composition to the appropriate substrate, the outer surface of the film may be treated as noted herein to increase its surface energy. This treatment can be accomplished by employing known techniques, such as flame treatment, plasma, corona discharge, film chlorination, e.g., exposure of the film surface to gaseous chlorine, treatment with oxidizing agents such as chromic acid, hot air or steam treatment, flame treatment and the like. Although any of these techniques is effectively employed to pre-treat the film surface, a frequently preferred method is corona discharge, an electronic treatment method that includes exposing the film surface to a high voltage corona discharge while passing the film between a pair of spaced electrodes. After treatment of the film surface, the coating composition is then applied thereto.

An intermediate primer coating may be applied to the multi-layer films. In this case, the film may be first treated by one of the foregoing methods to provide increased active adhesive sites thereon and to the thus-treated film surface there may be subsequently applied a continuous coating of a primer material. Such primer materials are well known in the art and include, for example, epoxy and poly(ethylene imine) (PEI) materials. U.S. Pat. Nos. 3,753,769, 4,058,645, and 4,439,493 disclose the use and application of such primers. The primer provides an overall adhesively active surface for thorough and secure bonding with the subsequently applied coating composition and can be applied to the film by conventional solution coating means, for example, by roller application.

The coating composition can be applied to the film as a solution, one prepared with an organic solvent such as an alcohol, ketone, ester, or the like. However, since the coating composition can contain insoluble, finely divided inorganic materials that may be difficult to keep well dispersed in organic solvents, it is preferable that the coating composition be applied to the treated surface in any convenient manner, such as by gravure coating, roll coating, dipping, spraying, and the like. The excess aqueous solution may be removed by squeeze rolls, doctor knives, or the like.

The film may be stretched in the MD, coated with the coating composition and then stretched perpendicular in the TD. In yet another embodiment, the coating may be applied after biaxial orientation is completed.

The coating composition may be applied in such an amount that there will be deposited upon drying a smooth, evenly distributed layer. The coating may be dried by hot air, radiant heat, or by any other convenient means. Coatings may have coating weights ranging from about 0.5 g/m$^2$ to about 1.6 g/m$^2$ for conventional PVOH coatings, about 0.78 g/m$^2$ to about 2.33 g/m$^2$ for conventional acrylic and low temperature seal coatings (LTSC) and about 1.6 g/m$^2$ to about 6.2 g/m$^2$ for conventional PVdC coatings.

EXAMPLES

Test Methods

Haze was measured per ASTM D-1003.

Peel strength was measured as follows. Terphane™ 12 µm PET film was laminated onto the EVOH skin of the example film with Rohm & Haas 522 A&B adhesive. The coat weight of the adhesive was 1.85 lb/ream (about 0.84 kg/ream). Both sides of the laminated film were supported by taping with 3M Scotch 610 tape. The films were then cut to about 2.54 cm wide by about 12.7 cm long along the machine direction. The peel strength was then measured with an Instron machine (Sintech 1, MTS System Corporation) at 90° mode just after lamination and after 24-hours and 2 weeks of aging at room conditions.

Table 1 lists the materials used for the Examples below.

TABLE 1

| Material | Commercial Name | Commercial Source |
|---|---|---|
| Isotactic Polypropylene (iPP) MFR: 2.8 g/10 min Density: 0.9 g/cm³ | PP4612 | ExxonMobil Chemical Company Houston, TX, USA |
| Polyethylene MI: 4 g/10 min Tm: 127° C. Density: 0.9410 g/cm³ | Dowlex 2027G | The Dow Chemical Company Midland, MI, USA |
| Ethylene Vinyl Alcohol (EVOH) | Eval ™ G176B | Eval Company of America Houston, TX, USA |
| PP-g-MAH | Admer ™ 1179 | Mitsui Chemicals, Inc. Tokyo, Japan |
| Styrene-Ethylene-Butene-Styrene (SEBS)-g-MAH | Kraton FG 1901 | Kraton Polymers, Houston, USA |
| PP in Tie layer MFR: 11.5 g/10 min, 230° C./2.16 kg Density: 0.900 g/cm³ | Moplen HA510 | Basell Polyolefins, Netherlands |
| LLDPE-g-MAH MI: 2.0 g/10 min Density: 0.90 g/cm³ | Admer ™ NF908A | Mitsui Chemicals, Inc. Tokyo, Japan |
| Ethylene Elastomer (EE)-g-MAH | Admer ™ SF600 | Mitsui Chemicals, Inc. Tokyo, Japan |
| Propylene-ethylene copolymer C₂: 16 wt % MFR: 3 g/10 min ΔHf: 6 J/g Tm: 47° C. | Vistamaxx ™ 6100 | ExxonMobil Chemical Company, Houston, TX, USA |
| C₂: 10 wt % MFR: 8 g/10 min ΔHf: 29 J/g Tm: 65° C. | Vistamaxx ™ 3000 | |
| Ethylene Octene Copolymer Melt Index (reported): 1.1 g/10 min Density (reported): 0.882 g/cm³ | Exact ™ 8201 | ExxonMobil Chemical Company, Houston, TX, USA |

Polymer A was based on Vistamaxx™ 6100, had a MFR (190° C., 1.2 kg) of 8 g/10 min a grafting level of 0.5 wt % and was prepared as follows. Vistamaxx™ 6100 was grafted in a non-intermeshing counter-rotating twin screw extruder (30 cm, L/D=48) under the following conditions: 98.8 wt % of polymer, and 1.2 wt % of Crystalman™ maleic anhydride were fed at 7 kg/h feed rate to the hopper of the extruder and 0.5 wt % of a 10% solution of Luperox™ 101 dissolved in Marcol™ 52 oil was added to the second barrel. The screw speed was set at 160 rpm and the following temperature profile in the four-zone extruder was used: 160° C., 180° C., 190° C., 160° C. with the exit die at 180° C. Excess reagents as well as peroxide decomposition products were removed with vacuum prior to polymer recovery.

Polymer B was based on a blend (75/25 by weight) of Vistamaxx™ 3000 and Exact™ 8201, had an MFR (190° C., 1.2 kg) of 5 g/10 min, a grafting level of 0.5 wt %, and was prepared as follows. About 99 wt % of the blend and 1 wt % of Crystalman™ maleic anhydride were fed at 7 kg/h feed rate to the hopper of the extruder and 0.54 wt % of a 10% solution of Luperox™ 101 dissolved in Marcol™ 52 oil was added to the second barrel, as above. The screw speed was set at 300 rpm and following temperature profile was used: 180° C., 190° C., 210° C., 160° C. with the exit die at 135° C. Polymer B has an enthalpy of fusion of 33 J/g and a melting point of 65° C.

Examples 1-5 were prepared on a pilot film line and Examples 6-8 on a commercial scale film line as follows. A four-layer biaxially-oriented film was prepared on the pilot orienter by co-extruding a primary core layer of isotactic polypropylene (iPP), a first metallizable and barrier layer of ethylene vinyl alcohol (EVOH), a second outside printable skin layer of polyethylene and an adhesive tie layer between the core layer and the EVOH skin layer. The tie layer formulations are shown in Table 2. The tie layer was produced by separately feeding the different components to the extruder.

The films of the examples were cast on a chill roll at 30° C. to 50° C., reheated to 120° C., and stretched in the machine direction (MD) 5 times by using a series of rolls operating at different speeds. After the MD orientation, the film was stretched in the transverse direction (TD) 8 times at 160° C.

TABLE 2

| | | Haze | Peel Strength (g/cm) | | |
|---|---|---|---|---|---|
| Example | Tie Layer Formulation | (%) | 0 hrs | 24 hrs | 2 Weeks |
| 1 | PP-g-MAH | 2.35 | 160 | 110 | Not measured |
| 2 | Blends of 90% PP-g-MAH and 10% SEBS-g-MAH | 2.43 | 86 | 70 | Not measured |
| 3 | Blends of 80% PP-g-MAH and 20% LLDPE-g-MAH | 3.61 | 124 | 120 | Not measured |
| 4 | Blends of 80% PP-g-MAH and 20% EE-g-MAH | 3.09 | 118 | 149 | Not measured |
| 5 | Blends of 50% PP4612 and 50% Polymer A | 3.55 | 355 | 250 | Not measured |
| 6 | PP-g-MAH | 2.00 | 197 | 215 | 251 |
| 7 | Blends of 70% PP4612 and 30% Polymer B | 2.25 | 508 | 477 | 384 |
| 8 | Blends of 85% PP-g-MAH and 15% Polymer B | 1.71 | 504 | 569 | 873 |

In Examples 5, 7 and 8, a blend of backbones was used for the production of the grafted polymers (Polymers A and B) of the co-extruded tie resin (CTR). The resulting films had an overall gauge of 25 μm, with a core layer of 21.25 μm, an EVOH skin layer of 1.5 μm, a tie layer of 1.0 μm and a printable skin layer of 1.25 μm. Table 2 shows inventive Examples 5, 7 and 8 which had substantially high initial (0 hr), 24 hour, and 2 week aged peel strengths, as compared to the commercially available blends (Examples 1-4 and 6).

Further embodiments of the present invention are described in the following paragraphs:

A. A multi-layer film, comprising:
   a. a core layer; and
   b. a first tie layer comprising at least 5 wt % grafted propylene-based polymer, based upon the weight of the first tie layer, the grafted propylene-based polymer comprising a propylene-based polymer backbone and a grafting monomer, the grafted propylene-based polymer having a DSC melting temperature of 105° C. or less and a heat of fusion of 75 J/g or less.

B. The multi-layer film of paragraph A, wherein the multi-layer film further comprises a first skin layer, the first tie layer being intermediate the core layer and the first skin layer.

C. The multi-layer film of paragraph B wherein the first skin layer is a barrier layer.

D. The multi-layer film of any of paragraphs B-C wherein the first skin layer comprises at least one polar polymer.

E. The multi-layer film according to any of the previous paragraphs wherein the grafting monomer is selected from the group consisting of maleic anhydride, methyl methacrylate, acrylic acid, methacrylic acid, hydroxyethyl methacrylate, hydroxypropyl methacrylate, glycidyl methacrylate and combinations thereof.

F. The multi-layer film according to any of the previous paragraphs, wherein the first tie layer comprises at least 20 wt % of the grafted propylene-based polymer.

G. The multi-layer film according to any of the previous paragraphs, wherein the grafted propylene-based polymer has a DSC melting temperature of less than or equal to 90° C.

H. The multi-layer film according to any of the previous paragraphs, wherein the grafted propylene-based polymer has a DSC melting temperature of less than 75° C.

I. The multi-layer film according to any of the previous paragraphs, wherein the grafted propylene-based polymer comprises propylene, one or more $C_2$ or $C_4$-$C_{20}$ alpha olefins, and optionally a non-conjugated diene, with propylene being the majority component.

J. The multi-layer film according to any of the previous paragraphs, wherein the grafted propylene-based polymer comprises about 5 to about 32 mol %, of a $C_2$ and/or a $C_4$-$C_{20}$ alpha-olefin.

K. The multi-layer film according to any of the previous paragraphs, wherein the grafted propylene-based polymer comprises propylene, ethylene, and optionally 5-ethylidene-2-norbornene (ENB), with propylene being the majority component.

L. The multi-layer film according to any of the previous paragraphs, wherein the grafted propylene-based polymer has a melt flow rate of 0.2 to 25 g/10 min (at 190° C., 1.2 kg) or less.

M. The multi-layer film according to any of the previous paragraphs, wherein the first tie layer further comprises one or more other $C_2$-$C_8$ copolymers or terpolymers.

N. The multi-layer film according to any of the previous paragraphs, wherein the film is biaxially oriented, un-oriented, or uniaxially oriented.

O. The multi-layer film according to any of the previous paragraphs, wherein the grafted propylene-based polymer has a Mooney viscosity ML (1+4)@125° C. of less than 100.

P. The multi-layer film according to any of the previous paragraphs, wherein the grafted propylene-based polymer has a melt flow rate of about 1.0 to about 15.0 g/10 min (230° C., 2.16 kg).

Q. The multi-layer film according to any of the previous paragraphs, wherein the first tie layer further comprises an ethylene alpha-olefin copolymer in an amount of about 1-95 wt %, based upon the weight of first tie layer.

R. The multi-layer film of paragraphs A-C, wherein the first tie layer further comprises a propylene polymer in an amount of about 1-95 wt %, based upon the weight of the first tie layer.

S. The multi-layer film according to any of the previous paragraphs, wherein the core layer comprises at least one polymer selected from the group consisting of propylene polymers, ethylene polymers, isotactic polypropylene, ethylene-propylene copolymers and combinations thereof.

T. The multi-layer film according to any of the previous paragraphs, wherein the core layer further comprises at least one additive selected from the group consisting of opacifying agents, void-initiating particles, hydrocarbon resins, fillers, anti-static agents, and combinations thereof.

U. The multi-layer film according to any of paragraphs B-T, wherein at least one of the core layer, first tie layer and/or first skin layer further comprises at least one additive selected from the group consisting of opacifying agents, cavitating agents, fillers, anti-blocks, anti-static agents, coefficient of friction (COF) modifiers, processing aids, colorants, and combinations thereof.

V. The multi-layer film according to any of the previous paragraphs, wherein at least a portion of at least one of the outer surfaces of the film is metallized.

W. The multi-layer film according to any of the previous paragraphs, wherein the first tie layer further comprises one or more other polypropylene homopolymers or random copolymers.

X. The multi-layer film of any of the previous paragraphs, wherein at least a portion of at least one of the outer surfaces of the film is surface-treated.

Y. The multi-layer film of paragraph X, wherein the surface treatment is selected from the group consisting of corona discharge, flame, plasma, chemical treatment, treatment by means of a polarized flame, and combinations thereof.

Z. The multi-layer film of any of the preceding paragraphs, wherein one or more of the layers are contacted with a coating selected from the group consisting of acrylic polymers, such as ethylene acrylic acid (EAA), ethylene methyl acrylate copolymers (EMA), polyvinylidene chloride (PVdC), poly(vinyl)alcohol (PVOH), EVOH, and combinations thereof.

AA. The film according to any of the previous paragraphs, wherein the film further comprises a second skin layer located opposite the core layer from the first tie layer.

BB. The film according to any of the previous paragraphs, wherein the film further comprises a second skin layer located on the side of the core layer opposite from the first tie layer and a second tie layer located intermediate the core layer and the second skin layer.

All documents described herein are incorporated by reference, including any priority documents and/or testing procedures. While various specific embodiments have been illustrated and described, various modifications can be made without departing from the spirit and scope of the disclosure. Accordingly, it is not intended that the disclosure be limited thereby. Likewise, the term "comprising" is considered synonymous with the term "including" for purposes of Australian law.

We claim:

1. A multi-layer film, comprising:
   a. a core layer; and
   b. a first tie layer comprising at least 10 wt % grafted propylene-based polymer, based upon the weight of the first tie layer, the grafted propylene-based polymer comprising a propylene-based polymer backbone having from about 5 to about 24 wt % ethylene, and a grafting monomer, the grafted propylene-based polymer having a DSC melting temperature of 120° C. or less and a heat of fusion of 75 J/g or less.

2. The multi-layer film of claim 1, wherein the grafted propylene-based polymer has isotactic propylene crystallinity.

3. The multi-layer film of claim 1, wherein the multi-layer film further comprises a first skin layer, the first tie layer being intermediate the core layer and the first skin layer.

4. The multi-layer film of claim 3, wherein the first skin layer is a barrier layer.

5. The multi-layer film of claim 4, wherein the barrier layer comprises at least one moisture barrier additive or gas barrier additive.

6. The multi-layer film of claim 3, wherein the first skin layer comprises at least one polar polymer.

7. The multi-layer film of claim 1, wherein the grafting monomer is selected from the group consisting of maleic anhydride, methyl methacrylate, acrylic acid, methacrylic acid, hydroxyethyl methacrylate, hydroxypropyl methacrylate, glycidyl methacrylate and combinations thereof.

8. The multi-layer film of claim 1, wherein the first tie layer comprises at least 20 wt % of the grafted propylene-based polymer.

9. The multi-layer film of claim 1, wherein the grafted propylene-based polymer has a DSC melting temperature less than 105° C.

10. The multi-layer film of claim 1, wherein the grafted propylene-based polymer has a DSC melting temperature of less than 90° C.

11. The multi-layer film of claim 1, wherein the grafted propylene-based polymer has a DSC melting temperature of less than 75° C.

12. The multi-layer film of claim 1, wherein the grafted propylene-based polymer comprises from about 5 to about 16 wt % ethylene.

13. The multi-layer film of claim 1, wherein the grafted propylene-based polymer comprises from about 8 to about 15 wt % ethylene.

14. The multi-layer film of claim 1, wherein the grafted propylene-based polymer has a melt flow rate of 25 g/10 min (at 190° C., 1.2 kg) or less.

15. The multi-layer film of claim 1, wherein the grafted propylene-based polymer has a melt flow rate equal to or greater than 0.2 g/10 min (at 190° C., 1.2 kg).

16. The multi-layer film of claim 1, wherein the first tie layer further comprises one or more other $C_2$-$C_8$ copolymers or terpolymers.

17. The multi-layer film of claim 1, wherein the film is biaxially oriented.

18. The multi-layer film of claim 1, wherein the film is un-oriented.

19. The multi-layer film of claim 1, wherein the film is uniaxially oriented.

20. The multi-layer film of claim 1, wherein the grafted propylene-based polymer has a triad tacticity index of at least 75%.

21. The multi-layer film of claim 1, wherein the grafted propylene-based polymer has a Mooney viscosity ML (1+4)@125° C. of less than 100.

22. The multi-layer film of claim 1, wherein the grafted propylene-based polymer has a % crystallinity of from about 0.5 to about 40.

23. The multi-layer film of claim 1, wherein the grafted propylene-based polymer has a crystallization temperature (Tc) measured with differential scanning calorimetry (DSC) of about 160° C. or less.

24. The multi-layer film of claim 1, wherein the grafted propylene-based polymer has a density of about 0.85 to about 0.92 g/cm³.

25. The multi-layer film of claim 1, wherein the grafted propylene-based polymer has a molecular weight distribution of from about 1.5 to about 40.0.

26. The multi-layer film of claim 1, wherein the grafted propylene-based polymer has a weight average molecular weight (Mw) of about 5,000,000 or less, a number average molecular weight (Mn) of about 3,000,000 or less, a z-average molecular weight (Mz) of about 10,000,000 or less, and a g' index of about 0.95 or greater.

27. The multi-layer film of claim 1, wherein the propylene-based polymer backbone monomers are polymerized in the presence of a metallocene catalyst system.

28. The multi-layer film of claim 1, wherein the grafted propylene-based polymer comprises propylene, ethylene, and optionally a non-conjugated diene, with propylene being the majority component.

29. The multi-layer film of claim 28, wherein the grafted propylene-based polymer comprises propylene, ethylene, and optionally 5-ethylidene-2-norbornene (ENB), with propylene being the majority component.

30. The multi-layer film of claim 1, wherein the grafted propylene-based polymer has a melt flow rate of about 1.0 to about 15.0 g/10 min (230° C., 2.16 kg).

31. The multi-layer film of claim 1, wherein the first tie layer further comprises an ethylene alpha-olefin copolymer in an amount of about 1-95 wt %, based upon the weight of the first tie layer.

32. The multi-layer film of claim 1, wherein the first tie layer further comprises one or more other polypropylene homopolymers or random copolymers.

33. The multi-layer film of claim 1, wherein the core layer comprises at least one polymer selected from the group consisting of propylene polymers, ethylene polymers, isotactic polypropylene, ethylene-propylene copolymers and combinations thereof.

34. The multi-layer film of claim 1, wherein the core layer further comprises at least one additive selected from the group consisting of opacifying agents, void-initiating particles, hydrocarbon resins, fillers, anti-static agents, and combinations thereof.

35. The multi-layer film of claim 3, wherein at least one of the core layer, first tie layer and/or first skin layer further comprises at least one additive selected from the group consisting of opacifying agents, cavitating agents, nucleating agents, clarifying agents, fillers, anti-blocks, anti-static agents, coefficient of friction (COF) modifiers, processing aids, colorants, and combinations thereof.

36. The multi-layer film of claim 3, wherein at least a portion of at least one of the outer surfaces of the film is metallized.

37. The multi-layer film of claim 3, wherein at least a portion of at least one of the outer surfaces of the film is surface-treated.

38. The multi-layer film of claim 37, wherein the surface treatment is selected from the group consisting of corona discharge, flame, plasma, chemical treatment, treatment by means of a polarized flame, and combinations thereof.

39. The multi-layer film of claim 3, wherein at least a portion of at least one of the outer surfaces of the film is contacted with one or more coatings.

40. The multi-layer film of claim 39, wherein the one or more coatings is selected from the group consisting of acrylic polymers, such as ethylene acrylic acid (EAA), ethylene methyl acrylate copolymers (EMA), polyvinylidene chloride (PVdC), poly(vinyl)alcohol (PVOH), EVOH, Polyamide (PA), Polyethylene terephtalate (PET), and combinations thereof.

41. The multi-layer film of claim 39, wherein the coatings are applied by a method selected from the group consisting of an emulsion coating technique, by co-extrusion, lamination, and combinations thereof.

42. A method of improving the peel resistance of a multi-layer film by forming a film comprising: a core layer and a first tie layer comprising at least 10 wt % grafted propylene-based polymer, based upon the weight of the first tie layer, the grafted propylene-based polymer comprising a propylene-based polymer backbone having from about 5 to about 24 wt % ethylene, and a grafting monomer, the grafted propylene-based polymer having a DSC melting temperature of 120° C. or less and a heat of fusion of 75 J/g or less.

43. A multi-layer film comprising:
a. a core layer;
b. a first tie layer comprising at least 10 wt % grafted propylene-based polymer, based upon the weight of the layer, the grafted propylene-based polymer comprising a propylene-based polymer backbone having from about 3 to about 24 wt % ethylene and/or a $C_4$-$C_{20}$ olefin, and a grafting monomer, the grafted propylene-based polymer having a DSC melting temperature of 120° C. or less and a heat of fusion of 75 J/g or less;
c. a first skin layer, wherein the first tie layer is located intermediate the core layer and the first skin layer; and
d. a second skin layer located on the opposite side of the core layer from the first tie layer.

44. A multi-layer film comprising;
a. a core layer;
b. a first tie layer comprising at least 10 wt % grafted propylene-based polymer based upon the weight of the layer, the grafted propylene-based polymer comprising a propylene-based polymer backbone having from about 5 to about 24 wt % ethylene, and a grafting monomer, the grafted propylene-based polymer having a DSC melting temperature of 120° C. or less and a heat of fusion of 75 J/g or less;
c. a first skin layer, wherein the first tie layer is located intermediate of the core layer and the first skin layer;
d. a second tie layer located on a side of the core layer opposite from the first tie layer; and
e. a second skin layer, wherein the second tie layer is located intermediate the core layer and the second skin layer.

45. The multi-layer film of claim 44, wherein the first tie layer and the second tie layer are made from and/or comprise the same material.

46. The multi-layer film of claim 44, wherein the first tie layer and the second tie layer are made from and/or comprise one or more different materials.

47. A process comprising forming a multi-layer film comprising: a core layer and a first tie layer, the first tie layer comprising at least 10 wt % grafted propylene-based polymer, based upon the weight of the layer, the grafted propylene-based polymer comprising a propylene-based polymer backbone having from about 5 to about 24 wt % ethylene, and a grafting monomer, the grafted propylene-based polymer having a DSC melting temperature of 120° C. or less and a heat of fusion of 75 J/g or less.

48. The multi-layer film of claim 1, wherein the first tie layer further comprises a propylene polymer in an amount of about 5-90 wt %, based upon the weight of the first tie layer.

* * * * *